United States Patent [19]

Wootten

[11] 3,813,891

[45] June 4, 1974

[54] METHOD AND APPARATUS FOR RETARDING ICE FORMATION IN AN ICE FISHING HOLE

[76] Inventor: Homer C. Wootten, Rt. 1, Box 25, Hillman, Mich. 49746

[22] Filed: Aug. 13, 1973

[21] Appl. No.: 388,042

[52] U.S. Cl............... 62/56, 62/259, 62/531, 43/1, 43/4, 249/79, 62/260
[51] Int. Cl............................................. F25d 23/12
[58] Field of Search .............. 62/260, 531, 259, 56; 43/1, 4, 56; 249/79, 66

[56] References Cited
UNITED STATES PATENTS

| | | | |
|---|---|---|---|
| 2,799,146 | 7/1957 | Meagher | 249/66 |
| 2,838,196 | 6/1958 | Chapman | 43/4 |
| 2,877,595 | 3/1959 | Steuart | 43/56 |
| 2,914,926 | 12/1959 | Meagher | 43/4 |
| 3,030,727 | 4/1962 | Steuart | 43/56 |
| 3,056,272 | 10/1962 | Silers | 249/79 |
| 3,059,451 | 10/1962 | Anderson | 43/4 |
| 3,555,827 | 1/1971 | Herr | 43/4 |

Primary Examiner—William J. Wye
Attorney, Agent, or Firm—Michael L. Bauchan

[57] ABSTRACT

A method and apparatus for preventing and retarding the freezing of ice fishing holes when not in use. The apparatus utilizes a buoyant housing having a passage therethrough in communication between the water in the ice fishing hole and the atmosphere. Covers in the housing prevent the passage of air and heat energy from the water through the passage to the atmosphere. The method includes the steps of surrounding an area of an ice fishing hole with an insulative material through which such a passage is provided and sealing the passage to prevent the transfer of air and heat energy through said passage.

4 Claims, 8 Drawing Figures

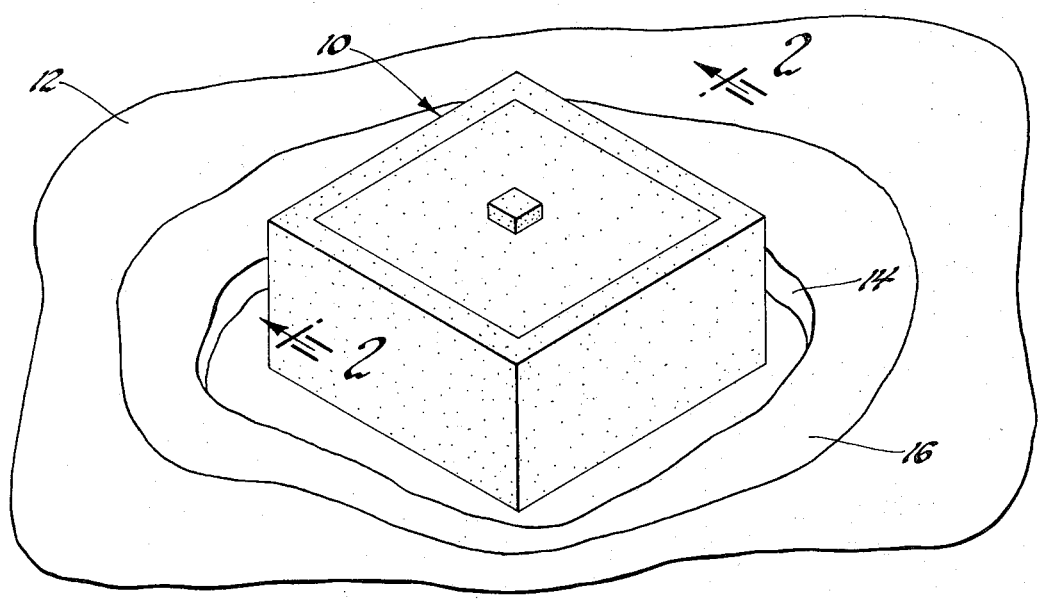
Fig. 1
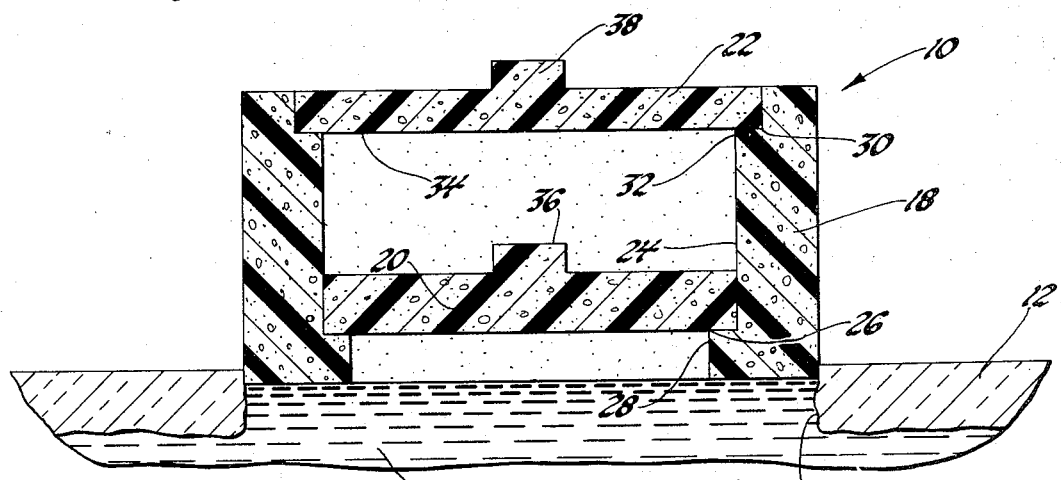
Fig. 2
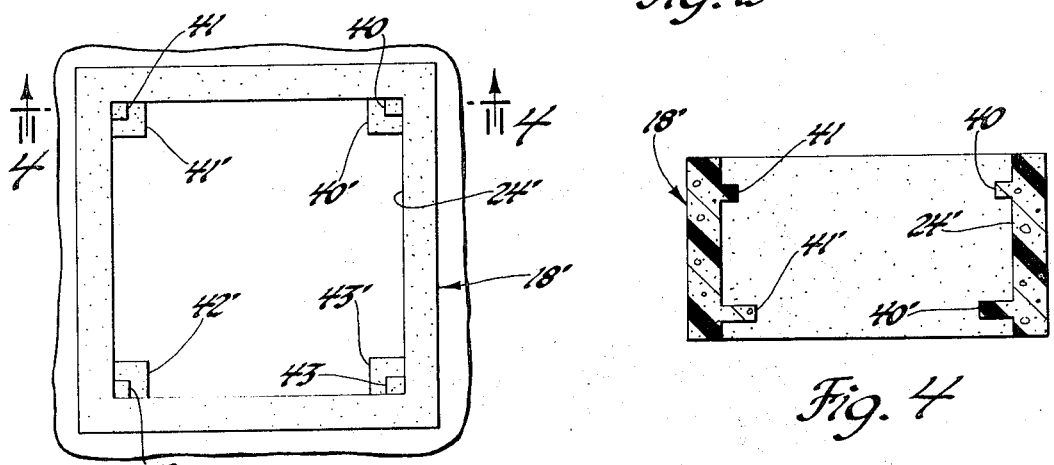
Fig. 3
Fig. 4

PATENTED JUN 4 1974 3,813,891

METHOD AND APPARATUS FOR RETARDING ICE FORMATION IN AN ICE FISHING HOLE

BACKGROUND OF THE INVENTION

The subject invention relates to ice fishing apparatus and, more specifically, to apparatus for retarding the freezing of holes chopped in the frozen surface of a lake through which fishing is conducted.

To engage in the pasttime of ice fishing, a fisherman customarily chops, drills, or saws an opening in the frozen surface of an ice covered lake. Due to the weight and flexibility of the ice surface across the lake, the water from beneath the frozen surface is usually forced by hydraulic pressure up into the opening and often spills out on the top surface of the surrounding ice in the form of a puddle. The water filled opening is commonly called an ice fishing hole, through which the act of fishing is performed. While the ice fishing hole remains free of ice for the duration of a fishing session of usual duration during a single day, with the coming of night and consequent lower temperatures, an ice fishing hole usually freezes solid. Depending on weather conditions, the ice fishing hole during the overnight period can freeze as solid and to the same depth as surrounding ice.

It is therefore an object of this invention to provide a method and apparatus for retarding an ice fishing hole from freezing when not in use.

More specifically, it is an object of this invention to provide apparatus for preventing the dissipation of heat from the water in an ice fishing hole so as to preclude water in the ice fishing hole from freezing for a substantial period of time.

It is also an object of this invention to provide apparatus that includes an insulated housing adapted for placement on an ice fishing hole and insulated covers within the housing that when in position therein preclude the passage of heat energy through the housing and which may be removed to facilitate fishing through the housing.

It is yet a further object of this invention to provide a method for preventing heat dissipation from an ice fishing hole so as to retard freezing of the ice fishing hole by surrounding at least part of the ice fishing hole with insulating material and sealing the surrounded portion from the atmosphere by other insulating material designed to prevent the dissipation of heat energy from the surrounded water to the atmosphere.

DESCRIPTION OF THE DRAWINGS

The foregoing and other objects and advantages of the subject invention will become apparent from the following description and the accompanying drawings, in which:

FIG. 1 is a perspective view of ice fishing apparatus embodying the principles of the subject invention;

FIG. 2 is a sectional view of the apparatus of FIG. 1 taken along the lines 2—2;

FIG. 3 is a top plan view of an alternative embodiment of the housing employed in the apparatus of FIG. 1;

FIG. 4 is a cross-sectional view of the alternative embodiment of the housing in FIG. 3 taken along lines 4—4;

DESCRIPTION OF THE PREFERRED EMBODIMENTS

Figure 5:
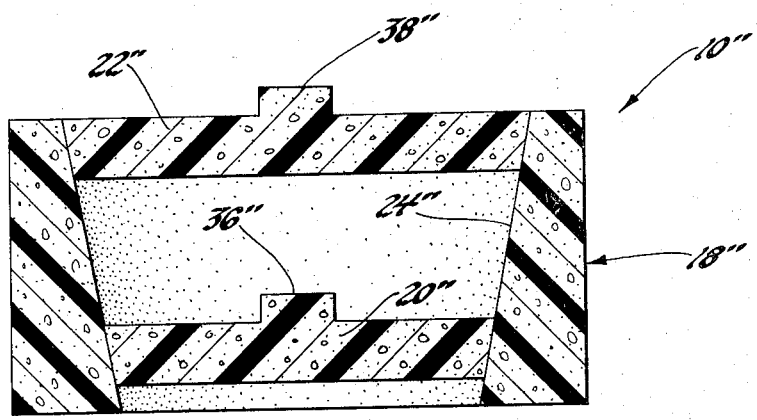
FIG. 5 is a cross-sectional view of an alternative embodiment of the invention taken along the lines 2—2 in FIG. 1.

As shown in FIG. 1, the subject ice fishing apparatus indicated generally at 10 is adapted for use on a frozen lake ice surface 12 in which a hole 14 has been chopped whereby water 16 from the hole 14 has spilled outward on the frozen ice surface 12. The subject apparatus 10 is made of a substance having a very low thermal conductivity, such as styrofoam, and which is also extremely buoyant. As persons versed in the art will appreciate, various other materials of other thermal conductivity and buoyancy than styrofoam may be utilized in practicing the subject invention, but styrofoam has been determined to provide quite satisfactory results.

As shown in FIG. 2, the subject apparatus 10 is comprised of a housing 18, an inner cover 20, and an outer cover 22. In the preferred embodiment of FIGS. 1 and 2, the housing 18 is of rectangular design through which a passage 24 is formed to provide communication between the water 16 and the atmosphere.

The housing 18, as shown in FIG. 2, is provided with a first peripheral notch 26 extending completely around the periphery of the internal housing surface. The inner cover 20 is dimensioned so that when it is pressed into the notch 26 it rests upon a ridge 28 formed in the inner surface of the housing 18 in such a manner that a substantially airtight seal is formed between the housing 18, the inner cover 20, and the ridge 28.

As is also illustrated in FIG. 2, a second peripheral notch 30 extending completely around the passage 24 is formed in the housing 18 whereby a second inner ridge 32 is provided to support the outer cover 22, which is designed to have a depending section 34 that extends into the passage 24 below the second peripheral notch 30. The outer cover 22 is dimensioned so that when it is pressed into the second peripheral notch 30 a substantially airtight seal is made between the outer cover 22, the housing 18, and the second peripheral ridge 32.

Both the inner cover 20 and the outer cover 22 are made of a material such as styrofoam that is light in weight and has a low rate of thermal conductivity. The airtight seals which each of the covers 20 and 22 make with the housing 18 thereby substantially prevent all air flow and heat passage from the water 16 through the housing 18 by either convection air flow through the passage 24 or by conductive heat transfer.

The covers 20 and 22 are provided with handles 36 and 38, respectively, which may be grasped to pull the respective covers 20 and 22 from the housing 18. The design of the handles 36 and 38, which may be either molded into the respective covers 20 and 22 or affixed thereto, may be of various designs, as persons versed in the art will appreciate. Persons versed in the art will similarly appreciate that the inner cover 20 could be designed to have a depending section surrounded by the first internal ridge 28 in a manner similar to the depending section 34 of the outer cover 22. However, in practice it has been determined that the splashing of water 16 in the passage 24 caused by the act of fishing through the housing 18 when the covers 20 and 22 are removed may cause ice formation on the first peripheral ridge 28 and thereby interfere with an airtight seal being formed between the inner cover 20 and the housing 18.

As shown in FIGS. 3 and 4, in an alternative embodiment of the subject invention the housing 18' may be designed to simply incorporate support blocks 40 through 43 in each corner of the passage 24 to support the outer cover 22. Similar support blocks 40' through 43' (the last two of which are not illustrated) may be formed in the housing 18 to support the inner cover 20. Persons versed in the art will appreciate that various other support means and mechanisms may be provided in the housing 18 to support the covers 20 and 22 and still assure that the covers 20 and 22 form airtight seals in the housing 18.

As shown in FIG. 5, in an alternative embodiment of the subject invention the housing 18" may be formed with a tapered inner surface whereby the passage 24" is tapered through the housing 18". In this embodiment the edges of the cover 20" and 22" are tapered at the same angle as the passage 24". Accordingly, when the covers 20" and 22" are inserted in the passage 24" they are easily pressed into the passage 24" to such a point whereby the respective covers 20" and 22" form airtight seals with the housing 18" in the manner aforedescribed.

Figure 6:
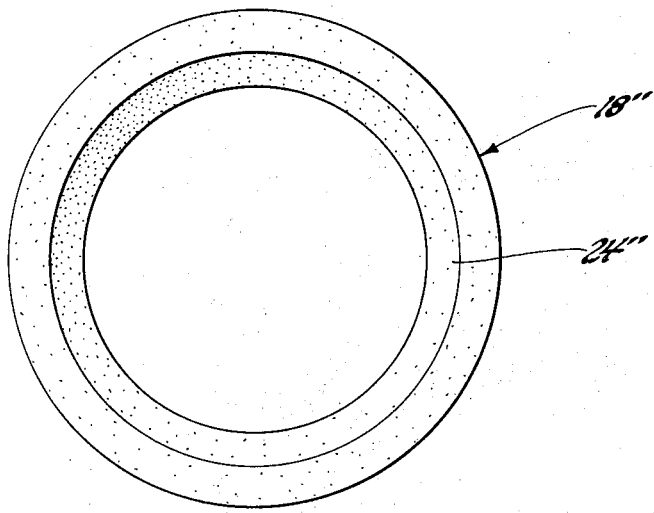
FIG. 6 is a top plan view of the housing employed in the embodiment of FIG. 5, but of annular design.
Figure 7:
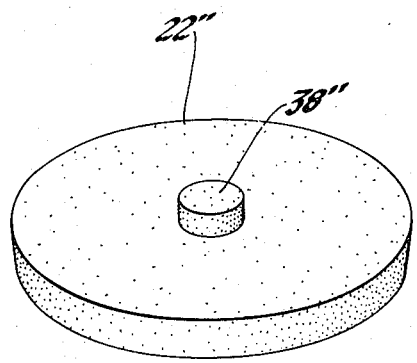
FIG. 7 is a perspective view of the outer cover employed in the embodiment of FIG. 5.
Figure 8:
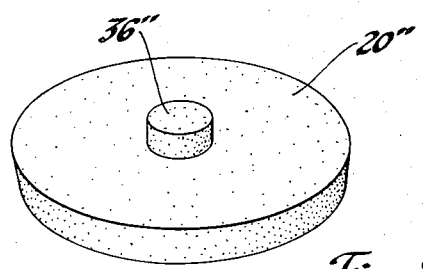
FIG. 8 is a perspective view of the inner cover employed in the embodiment of FIG. 5.

As shown in FIGS. 6, 7, and 8, in the embodiment of FIG. 5 the housing 18" and the covers 20" and 22" may be circular in shape rather than the aforedescribed rectangular shape, as viewed from the top. As persons versed in the art will appreciate, various other configurations that may in a particular type of ice fishing provide more desirable convenience in use may also be utilized without departing from the spirit of the subject invention.

To employ the apparatus 10 in the act of ice fishing, the hole 14 is first formed in the frozen lake surface 12. Water 16 normally is expelled from the hole 14 through hydraulic pressure of the ice surface upon the interior waters of the lake below the ice surface 12. Ice fishing during the initial period of operation of the ice fishing hole 14 can thus take place in the usual fashion directly through the ice fishing hole 14.

When the user of the subject apparatus has completed the initial fishing session; he places the subject apparatus 10 on the water 16 in the hole 14, surrounding an area of the ice fishing hole with an insulating material and sealing the passage through the insulating material against air and heat transfer therethrough by positioning the covers 20 and 22 in the passage as described. By these steps a method is provided of retarding the freezing of an ice fishing hole by preventing the transfer of air and heat energy between the hole and the atmosphere. During a relatively brief period of freezing temperatures, the water 16 freezes over to the outer edge of the housing 18 to form a solid ice surface surrounding the housing 18, as shown in FIG. 2. At this point freezing of the water 16 in the hole 14 is substantially retarded by the apparatus 10. For the water 16 to freeze in the hole 14 it is necessary that the water 16 give up heat energy to the atmosphere. That is, even though the water 16 may be at a temperature of 32° F., the water 16 will not solidify unless additional heat energy is removed therefrom.

Since the water 16 in the ice fishing hole 14 is surrounded by ice and other water having a temperature at least equal to the temperature of the water 16 in the hole 14, heat energy from the water 16 in the hole 14 cannot be dissipated very rapidly through the ice surface 12 or to surrounding waters. If the ice fishing hole 14 were not covered by the apparatus 10 the atmosphere, which could easily be several degrees colder in temperature than the water 16 in the fishing hole 14, would rapidly draw heat energy from the water 16. As this were being done the water 16 would freeze solid.

However, with the apparatus 10 in position in the ice fishing hole 14 the only air that is able to contact the water 16 is a limited amount of air between the surface of the water 16 and the underside of the inner cover 20. The apparatus 10 is designed so that the air in the space between the water 16 and the inner cover 20 is of a relatively small volume and thus cannot absorb from the water 16 more than a nominal amount of heat energy. Accordingly, when the air in the space between the inner cover 20 and the water 16 has attained the same temperature as the water 16, there will be substantially no further freezing of the water 16 in the ice fishing hole 14. By making the covers 20 and 22 and the housing 18 of a material such as styrofoam that has a low thermal conductivity, the heat dissipation from the water 16 through the apparatus 10 to the atmosphere by the means of thermal conduction is virtually eliminated. Similarly, since the inner cover 20 and the outer cover 22 cooperate with the housing 18 to form two separate airtight seals, substantially all passage of air through the passage 24 is prevented with the covers in the position illustrated in FIG. 2. Accordingly, the transfer of heat energy from the water 16 through the apparatus 10 through the process of air current convection is similarly prevented. Accordingly, the formation of ice across the ice fishing hole 14 beneath the apparatus 10 is substantially eliminated.

When the ice fisherman returns to the ice fishing hole 14 to continue his fishing in a subsequent session he may commence fishing merely by grasping the respective handles 38 and 36 so as to remove the outer and inner covers 22 and 20. He may then fish in the normal manner by dropping a fishing line through the passage 24 in the housing 18 and extracting therethrough fish which are caught.

A rough model of the subject apparatus has been built and successfully tested under various weather conditions. During the course of these tests it became apparent that under even the most severe weather conditions the subject apparatus substantially retarded the formation of ice in an ice fishing hole. Indeed, during a 1 week test where atmospheric temperatures had fallen below 0° F. each night, a layer of not more than 1/8 inch thickness of ice formed across the passageway of the housing. A test hole of a similar size and shape next to the subject apparatus, but exposed to the atmosphere, had frozen completely solid to a depth of several inches during the same period. In similar tests it has been determined that an unprotected and exposed hole adjoining the subject apparatus would freeze to a depth of from 2 to 3 inches each day, while only a thin sheet of ice would ever form in a 24 hour period across the passage in the housing of the subject apparatus.

When the ice fisherman is ready to abandon the ice fishing hole 14 and move to a new fishing location, he may remove the apparatus 10 from the ice fishing hole 14 by simply chipping the housing 18 away from the ice 12, which freezes up to the surface of the housing 18 and thus holds the apparatus 10 in position for subsequent sessions of ice fishing. Tools that have been found especially useful for this purpose are flat bladed shovels and hunting knives. It should be noted that by making the apparatus 10 conpletely out of a lightweight material such as styrofoam the entire apparatus 10 displaces only a nominal amount of water in the ice fishing hole 14 and thereby a minimum surface area of the housing 18 is frozen to the ice surface 12. Obviously, if the materials used in the apparatus 10 were of greater weight so as to displace a greater amount of water in the ice fishing hole 14, the housing 18 would become more rigidly secured to the ice surface 12 by having exposed thereto a greater surface area and thus the task of removing the apparatus 10 from the ice fishing hole would become more difficult.

Persons versed in the art will appreciate that various modifications and improvements may be made of the apparatus and method which are herein described without departing from the spirit of the invention, which is set forth in the accompanying claims.

What is claimed is:

1. Apparatus for retarding the freezing of ice fishing holes comprising, in combination, a substantially tubular member formed of a buoyant and highly insulative material and adapted to be situated in an ice fishing hole filled with water or ice, said member having a first open end in contact with water and ice in said hole, and the other end open to the atmosphere; internal cover means disposed in said tubular member so as to form a substantially airtight seal preventing the passage of air from the atmosphere through said tubular member to the surface of the water and ice below said tubular member; outer cover means disposed within said tubular member opposite said inner cover means from said water and ice so as to substantially prevent the passage of air through said tubular member between the atmosphere and the water and ice surrounded by said tubular member whereby substantially all air flow through said tubular member is prevented and a heat insulating air space is provided between said cover members so as to substantially prevent the passage of heat from ice and water below said tubular member through said tubular member to the atmosphere.

2. Ice fishing apparatus for retarding the freezing of ice fishing holes comprising, in combination, a housing formed of a buoyant material of low thermal conductivity adapted to be situated within an ice fishing hole and floated upon the ice and water therein situated, the housing having a passage therethrough, one end of said passage being in communication with said ice fishing hole and the other end of said passage being in communication with the atmosphere so as to facilitate the act of fishing by passage of fishing lines and fish through said passage; first cover means of a material of low thermal conductivity situated in said passage to form a substantially airtight seal with said housing and being proximate to said water surface and at a distance from said water sufficient to substantially preclude splashing of said water on the surface of said housing where said first cover contacts said housing so as to prevent the formation of ice between said cover and said housing, said first cover forming substantially an airtight seal with said housing so as to substantially prevent the passage of air flow through said passage; second cover means formed of a material having a low thermal conductivity situated in said passage at a distance from said first cover means in a direction opposite said ice fishing hole so as to form a substantially airtight seal between said second cover means and said housing whereby said second cover means prevents substantially all passage of air through said passage and an insulating air space if formed within said passage between said covers; and means for removing said first cover means and said second cover means from said housing to permit fishing through said passage.

3. Apparatus for retarding the freezing of ice fishing holes comprising, in combination, a housing formed of a buoyant material having a low thermal conductivity and adapted for being situated in an ice fishing hole, said housing having a passage therethrough that when said housing is so situated is in communication with the water present in said ice fishing hole, first support means in said housing approximate the water surface and defining a certain cross-sectional area of said passage at the location of said first support means; a first cover formed of a low thermal conductivity material situated in said passage and adapted to be supported by said first support means within said passage and to form an airtight seal between said first cover and said first support means and said housing whereby when said first cover is supported by said first support means in said housing substantially all air flow through said passage is prevented; second support means situated in said passage of said housing at a distance from said first cover and in a direction opposite said ice fishing hole; second cover adapted to be supported in said passage by said second support means and to form a substantially airtight seal with said second support means and said housing so as to prevent substantially all exchange and passage of air and heat energy between the water surface in communication with said passage and the atmosphere through said passage; and means for removing said first and second covers from said housing to facilitate the act of fishing through said housing.

4. The method of retarding the freezing of an ice fishing hole comprising the steps of surrounding an area in an ice fishing hole with a housing containing a passage in communication with both water in said hole and the atmosphere, said housing being formed of a buoyant material of low thermal conductivity so as to prevent the passage of heat energy from water surrounded by said material through said material and sealing the passage against the surface therethrough of air and heat energy by placing thereacross at least one removable cover formed of a material having a low thermal conductivity and adapted to form substantially an airtight seal with said housing across said passage.

* * * * *

UNITED STATES PATENT OFFICE
CERTIFICATE OF CORRECTION

Patent No. 3,813,891          Dated June 4, 1974

Inventor(s)  Homer C. Wootten

It is certified that error appears in the above-identified patent and that said Letters Patent are hereby corrected as shown below:

Column 6, line 58, "surface" should read -- transfer --.

Signed and sealed this 1st day of October 1974.

(SEAL)
Attest:

McCOY M. GIBSON JR.
Attesting Officer

C. MARSHALL DANN
Commissioner of Patents